(12) United States Patent
Nakaya et al.

(10) Patent No.: US 11,319,846 B2
(45) Date of Patent: May 3, 2022

(54) OIL SEPARATOR

(71) Applicant: NIFCO INC., Yokosuka (JP)

(72) Inventors: Hiroyuki Nakaya, Yokosuka (JP);
Kenji Takahashi, Yokosuka (JP);
Keisuke Utsu, Yokosuka (JP)

(73) Assignee: NIFCO INC., Yokosuka (JP)

( * ) Notice: Subject to any disclaimer, the term of this patent is extended or adjusted under 35 U.S.C. 154(b) by 168 days.

(21) Appl. No.: 16/633,746

(22) PCT Filed: Jul. 24, 2018

(86) PCT No.: PCT/JP2018/027639
§ 371 (c)(1),
(2) Date: Jan. 24, 2020

(87) PCT Pub. No.: WO2019/031224
PCT Pub. Date: Feb. 14, 2019

(65) Prior Publication Data
US 2020/0318508 A1    Oct. 8, 2020

(30) Foreign Application Priority Data

Aug. 8, 2017  (JP) .............................. JP2017-153192

(51) Int. Cl.
*B01D 19/00*        (2006.01)
*F01M 13/04*        (2006.01)
*B01D 39/08*        (2006.01)

(52) U.S. Cl.
CPC .......... *F01M 13/04* (2013.01); *B01D 19/0031* (2013.01); *B01D 39/08* (2013.01); *B01D 2239/0618* (2013.01)

(58) Field of Classification Search
CPC .... F01M 13/04; B01D 19/0031; B01D 39/08; B01D 2239/0618

(Continued)

(56) References Cited

U.S. PATENT DOCUMENTS 7,182,804 B2    2/2007  Gieseke et al.
8,252,079 B2    8/2012  Gruhler et al.
(Continued)

FOREIGN PATENT DOCUMENTS

CN    201771576 U    3/2011
CN    102119264 A    7/2011
(Continued)

OTHER PUBLICATIONS

PCT/ISA/210, "International Search Report for International Application No. PCT/JP2018/027639," dated Sep. 18, 2018.
(Continued)

*Primary Examiner* — T. Bennett McKenzie
(74) *Attorney, Agent, or Firm* — Manabu Kanesaka (57) ABSTRACT

An oil separator is provided, which can accurately control an interval between an introduction hole of a gaseous body and a separation member, and can ensure a stable and high separation performance. An oil separator 30 includes a wall portion 31 having a plurality of orifices 32, and a holding portion 34 holding a separation member 33. A facing surface 33A of the separation member 33 is disposed along a front face portion 42A of a positioning portion 42 having a plurality of opening portions 42D, so that an interval L between the orifices 32 and the facing surface 33A of the separation member 33 accurately has a desired distance. A gas separated from an oil smoothly flows downward along a flow path formed by the opening portions 42D so as to reduce a pressure loss.

7 Claims, 9 Drawing Sheets

(58) Field of Classification Search
USPC .......................................................... 96/155
See application file for complete search history.

(56) References Cited

U.S. PATENT DOCUMENTS

| | | | |
|---|---|---|---|
| 8,961,636 B2 | 2/2015 | Horiuchi | |
| 2002/0129586 A1* | 9/2002 | Tanaka | F01M 13/04 55/320 |
| 2003/0047074 A1* | 3/2003 | Liu | F01N 3/037 95/268 |
| 2010/0006075 A1* | 1/2010 | Ruppel | F01M 13/023 123/573 |
| 2010/0031940 A1* | 2/2010 | Mosset | B01D 46/0031 123/573 |
| 2011/0179755 A1* | 7/2011 | Gruhler | B29C 66/30321 55/320 |
| 2014/0352539 A1* | 12/2014 | Schleiden | B01D 45/12 95/272 |
| 2017/0072352 A1* | 3/2017 | Meister-Place | B01D 45/12 |
| 2018/0015401 A1* | 1/2018 | Bonne | F01M 13/04 |
| 2018/0119587 A1* | 5/2018 | Morishita | F01M 13/04 |
| 2020/0318508 A1* | 10/2020 | Nakaya | B01D 19/0031 |

FOREIGN PATENT DOCUMENTS

| | | | | |
|---|---|---|---|---|
| CN | 106837470 A | 6/2017 | | |
| JP | S55-158441 U | 11/1980 | | |
| JP | S57-81415 U | 5/1982 | | |
| JP | S60-84714 U | 6/1985 | | |
| JP | S600847 U | * 6/1985 | ............ | F01M 13/04 |
| JP | S-60084714 U | * 6/1985 | ............ | F01M 13/04 |
| JP | S60-108707 U | 7/1985 | | |
| JP | S62-10220 U | 1/1987 | | |
| JP | 63037466 Y2 | * 10/1988 | ............ | F01M 13/04 |
| JP | H01-91013 U | 6/1989 | | |
| JP | 2002-221018 A | 8/2002 | | |
| JP | 2003-518579 A | 6/2003 | | |
| JP | 2011-094507 A | 5/2011 | | |
| JP | 5152005 B2 | 2/2013 | | |
| JP | 2013-245597 A | 12/2013 | | |
| WO | 2017/122724 A1 | 7/2017 | | |

OTHER PUBLICATIONS

China Patent Office, "Office Action for Chinese Patent Application No. 201880048155.9," dated Mar. 29, 2021.

* cited by examiner

OIL SEPARATOR

RELATED APPLICATIONS

The present application is National Phase of International Application No. PCT/JP2018/027639 filed Jul. 24, 2018, and claims priority from Japanese Application No. 2017-153192, filed Aug. 8, 2017, the disclosure of which is hereby incorporated by reference herein in its entirety.

FIELD OF TECHNOLOGY

The present invention relates to an oil separator used for separating an oil from a blow-by gas.

BACKGROUND ART

In a vehicle such as an automobile and the like, the oil separator separating the oil from the blow-by gas is used. For example, in Patent Document 1 (Japanese Patent No. 5152005), there is disclosed a device wherein the blow-by gas which is narrowed by a communication hole and accelerated is blown on a non-woven fabric disposed in a gas flow path so as to separate an oil mist included in a gas.

PRIOR ART DOCUMENT

Patent Document

Patent Document 1: Japanese Patent No. 5152005

SUMMARY OF THE INVENTION

Problems to be Solved by the Invention

In such an oil separator, however, a distance from the communication hole (an introduction hole) to a surface of the non-woven fabric becomes a factor that determines a flow speed of the gas blown on the surface of the non-woven fabric and the like, and has a great effect on an oil separation performance. However, since there is great variability in a thickness of the non-woven fabric, there may be easily occurred great variability in the distance from the communication hole to the surface of the non-woven fabric. Consequently, in the oil separator using the conventional non-woven fabric, a stable oil separation performance cannot be guaranteed.

The present invention is made in view of the aforementioned circumstances, and an object of the present invention is to provide an oil separator that can accurately control an interval between the introduction hole for a gaseous body and a separation member, and can secure a stable and high separation performance.

Means for Solving the Problems

In order to obtain the aforementioned object, in the present invention, the following solution method is adopted. Namely, as described in the invention, an oil separator which separates an oil component from a gaseous body flowing in a flow path comprises a separation member for separating an oil from the gaseous body; an introduction portion including an introduction hole for introducing the gaseous body to the separation member; and a holding portion holding a facing surface of the separation member relative to the introduction hole at a position separated from the introduction hole at a predetermined interval.

According to the aforementioned solution method, an interval between the facing surface of the separation member relative to the introduction hole and the introduction hole can accurately have the predetermined interval so as to accurately control a flow speed of the gaseous body blown on the separation member from the introduction hole, and the like. Therefore, even when the separation member having variability in a thickness thereof is used, a high oil separation performance can be obtained.

The holding portion comprises a positioning portion disposed along the facing surface of the separation member, and the positioning portion may have a frame shape forming a plurality of opening portions. In that case, while the facing surface of the separation member is adequately held in an accurate position by the frame shape (for example, a lattice shape) of the positioning portion, the gaseous body is adequately blown on the separation member through the opening portions so as to secure the high oil separation performance.

The introduction hole may be disposed in a position facing the opening portion. In that case, in the gaseous body from the introduction hole, an oil separation can be adequately carried out in the separation member disposed inside the facing opening portion.

There is comprised an outflow port for allowing the gaseous body to flow out, and the frame shape of the positioning portion may form a flow path introducing the gaseous body to the outflow port. Also, in the flow path, a frame extending in an intersecting direction may not be provided. In that case, the gaseous body after the oil is separated flows smoothly along the flow path, and flows smoothly to a downstream side of the oil separator from the outflow port so as to reduce a pressure loss of the gaseous body. Also, the gaseous body flows in the flow path in such a way so as to flow along a surface of the separation member, so that the oil separation is adequately carried out meanwhile as well.

The positioning portion may be made of a material having a thermal conductivity higher than that of the separation member, and a small thermal capacity. In that case, since the positioning portion is made of the material (for example, metal) having the high thermal conductivity and the small thermal capacity, even in a case wherein an emulsified oil is attached to the positioning portion, since a temperature of the positioning portion promptly rises, the emulsified oil begins to dissolve, so that a separation performance cannot be lowered.

A separation chamber is formed between the positioning portion and the introduction portion (corresponding to the invention). In that case, a sufficient space is ensured between the positioning portion and the introduction portion, so that even when the emulsified oil is attached to the surface of the separation member, a gas flow path between the positioning portion and the introduction portion cannot be completely blocked.

The separation member may be made of a fiber material. In that case, as the separation member, the fiber material (for example, a non-woven fabric) is used so as to ensure the high oil separation performance at low cost.

A plurality of introduction holes may be provided. In that case, since the gaseous body is introduced at a plurality of positions in the separation member from the plurality of introduction holes, a wide range of the facing surface of the separation member can be effectively used. Also, since a diameter of the introduction hole can be reduced, the flow speed of the gaseous body can be increased so as to improve an oil separation performance.

Effect of the Invention

According to the present invention, in the oil separator, the holding portion holding the separation member comprises the positioning portion having the frame shape forming the plurality of opening portions, and the holding portion holds the facing surface of the separation member relative to the introduction hole along the positioning portion so as to accurately control the interval between the introduction hole and the separation member, and ensure the high oil separation performance. Also, the gaseous body is introduced by the flow path formed by the frame shape so as to smoothly flow toward the downstream side of the oil separator, thereby reducing the pressure loss of the gaseous body by the oil separator.

BEST MODES OF CARRYING OUT THE INVENTION

Hereinafter, based on the attached drawings, an embodiment of the present invention will be explained.

Figure 1:
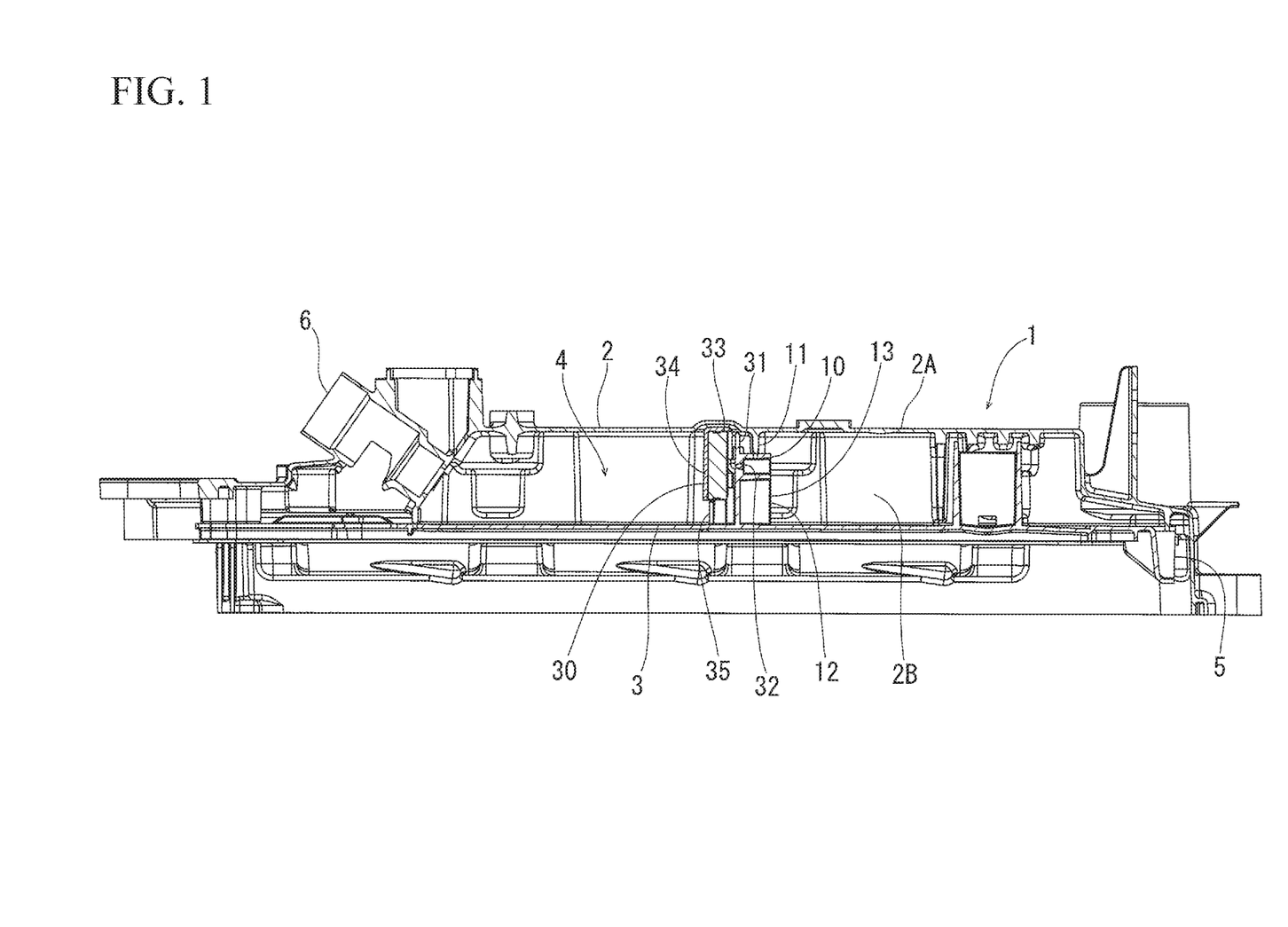
FIG. 1 is a cross-sectional view showing a blow-by gas conduit wherein an oil separator is installed according to an embodiment of the present invention.
Figure 2:
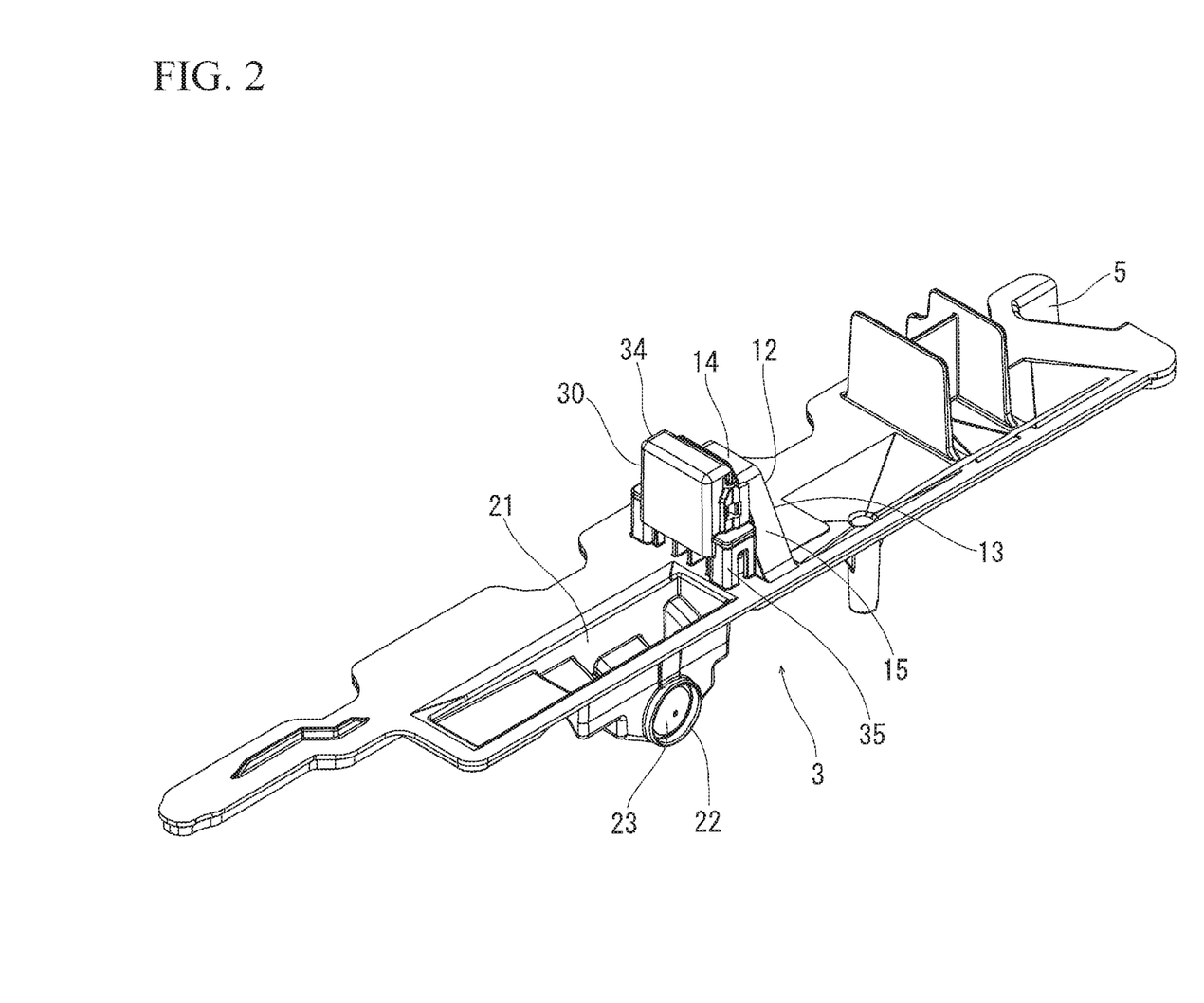
FIG. 2 is a perspective view showing a lower side member forming one portion of the blow-by gas conduit.
Figure 3:
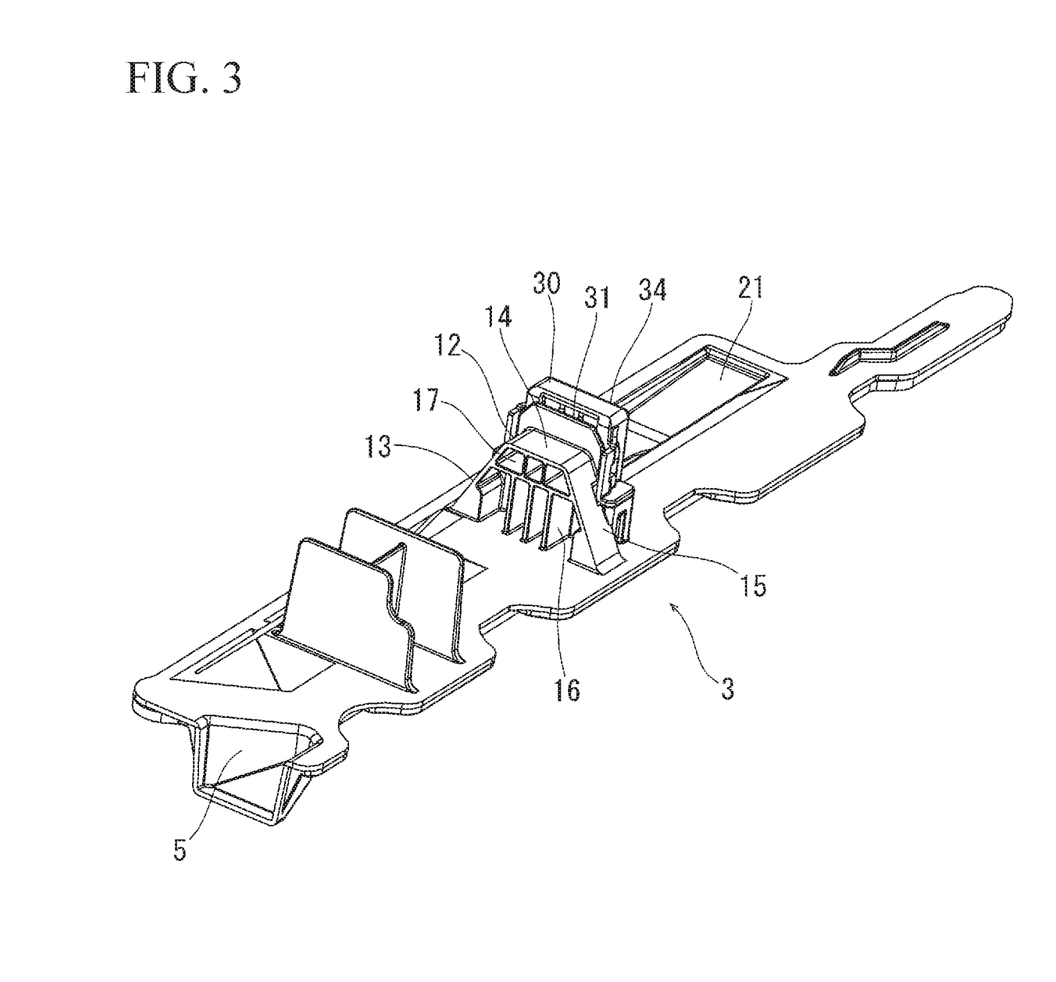
FIG. 3 is a perspective view showing the lower side member forming one portion of the blow-by gas conduit, and viewed from an opposite side.
Figure 4:
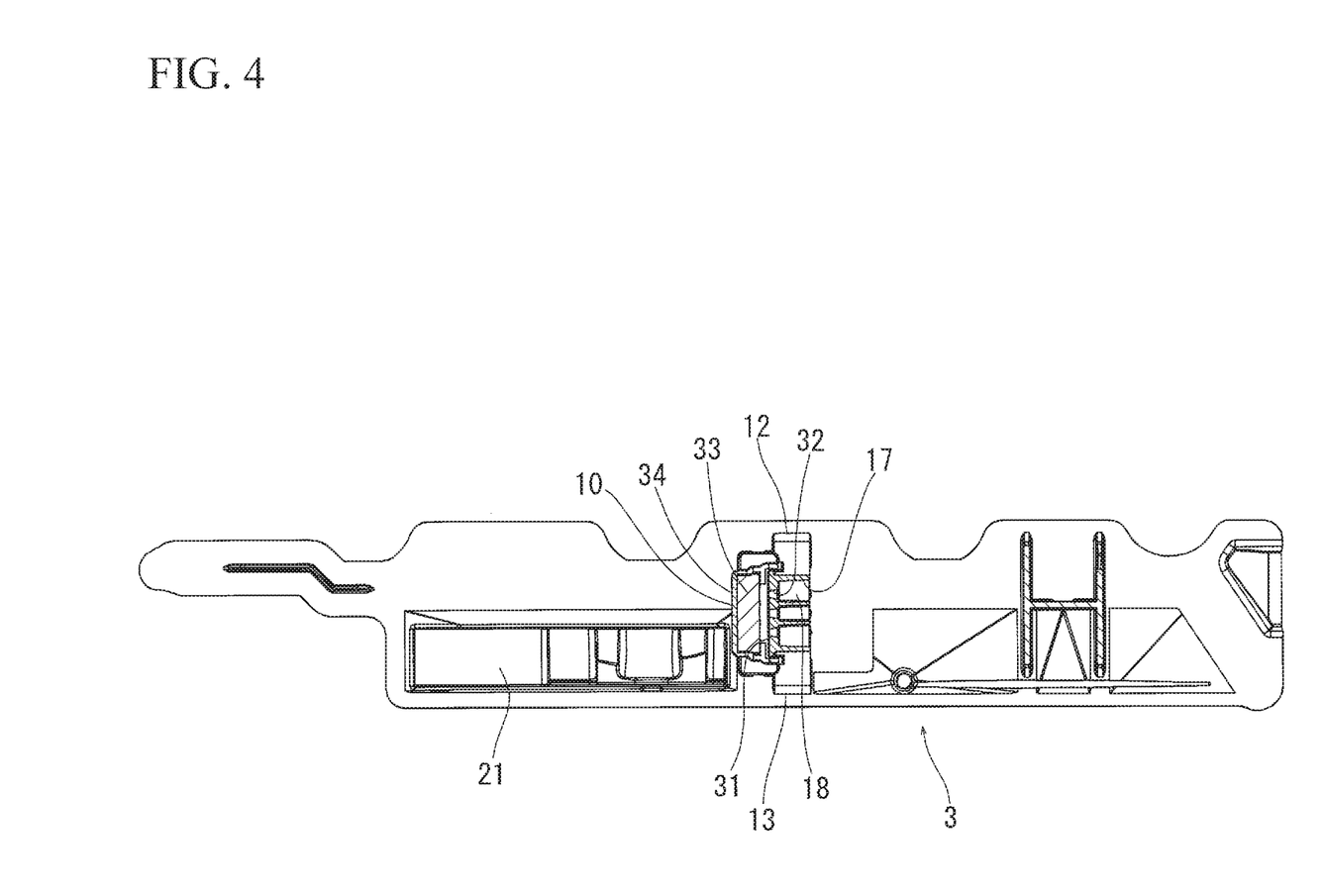
FIG. 4 is a plan view showing the lower side member forming one portion of the blow-by gas conduit.
Figure 5:
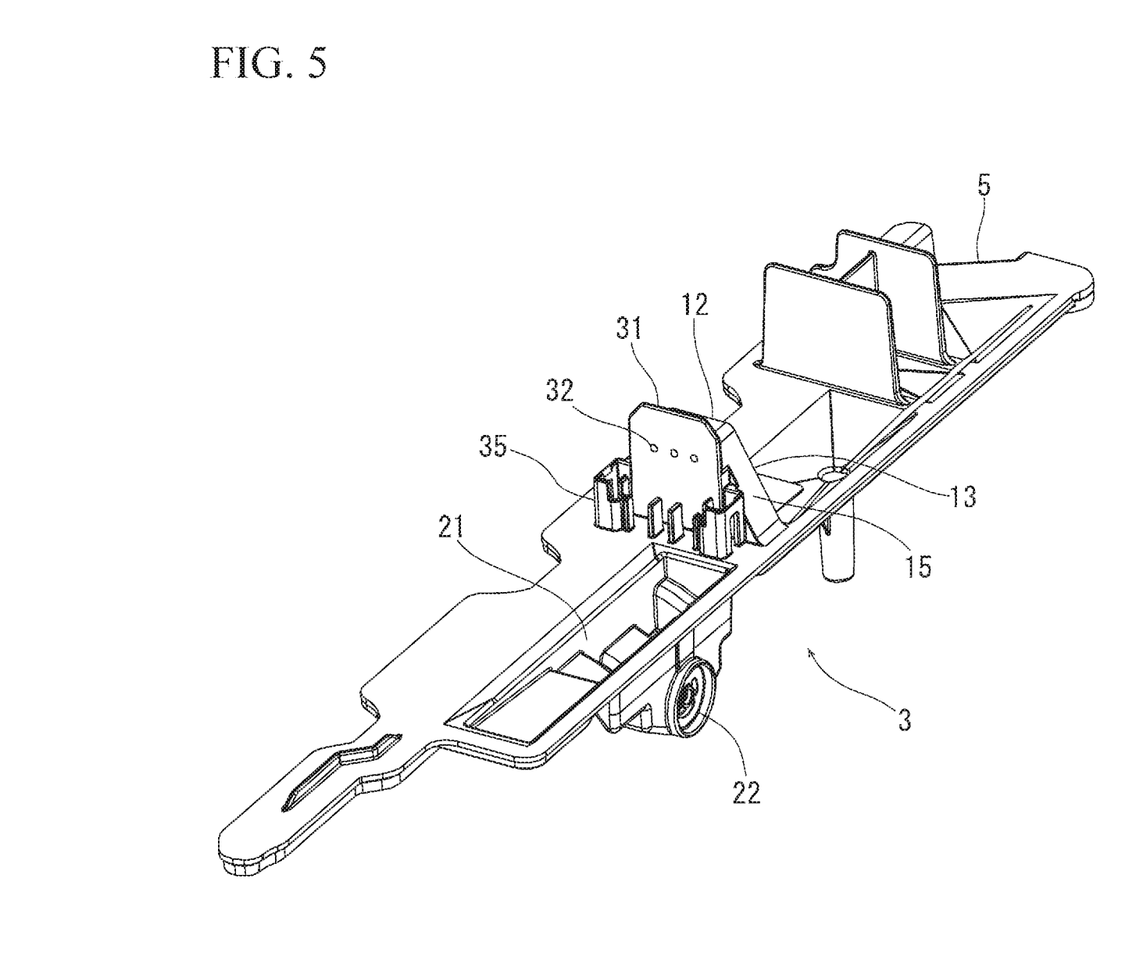
FIG. 5 is a perspective view showing the lower side member forming one portion of the blow-by gas conduit, and shows a state wherein one portion of the oil separator is removed.

FIG. 1 shows an overall structure of a blow-by gas conduit 1 wherein an oil separator 30 is attached according to the embodiment of the present invention. As shown in the drawing, the blow-by gas conduit 1 is formed by combining an upper side member 2 and a lower side member 3, and there is formed a fluid passage 4 in an area surrounded by both the members. A blow-by gas (a gaseous body leaked from a combustion chamber of an engine) is introduced from an opening end portion 5 on an upstream side provided in the lower side member 3, and is discharged from an opening end portion 6 on a downstream side provided in the upper side member 2 through the fluid passage 4. Incidentally, the upper side member 2 is a member integrated with a head cover of the engine, and includes a ceiling wall 2A and side walls 2B on both sides.

In the vicinity of a middle of the fluid passage 4, there are disposed a partition wall 10 partitioning the fluid passage 4 into the upstream side and the downstream side, and an oil separator 30 provided adjacent to the partition wall 10. The partition wall 10 is formed by joining (vibration welding in the present embodiment) an upper-side partition wall portion 11 provided to extend toward an inside of the fluid passage 4 from the upper side member 2 and a lower-side partition wall portion 12 provided to extend toward the inside of the fluid passage 4 from the lower side member 3.

Figure 6:
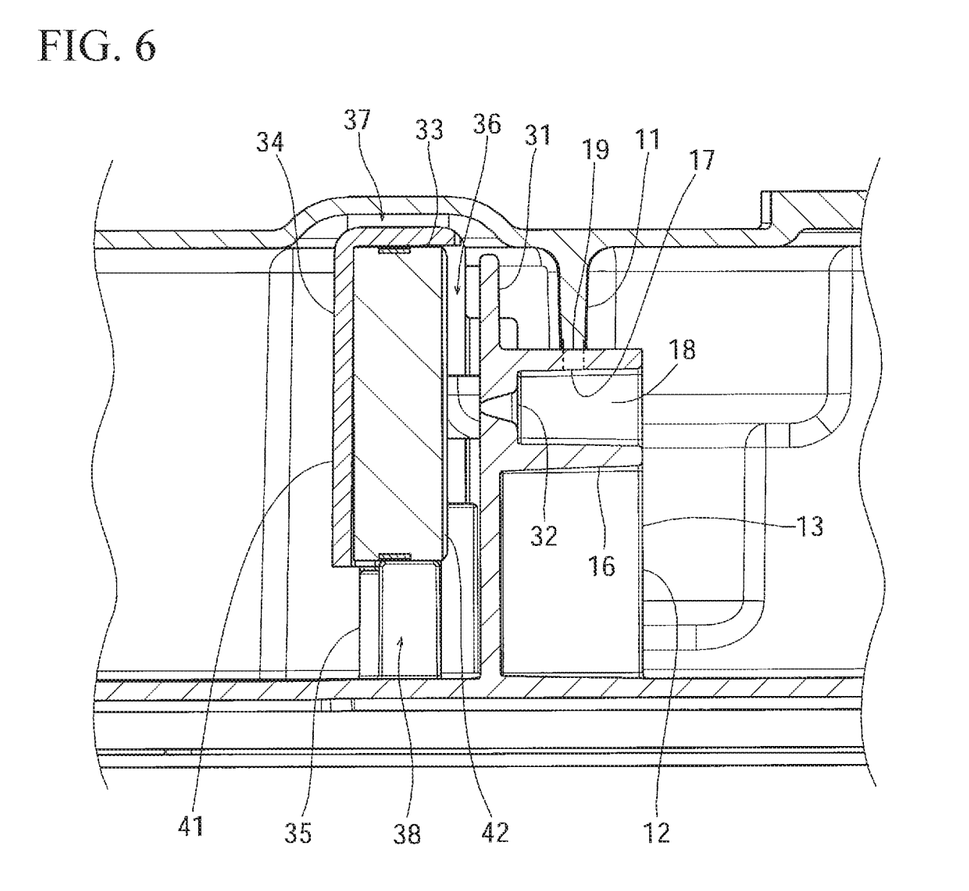
FIG. 6 is a longitudinal cross-sectional view showing one portion of the blow-by gas conduit.

In FIG. 2 to FIG. 5, the lower side member 3 is shown separately. Also, FIG. 6 shows an enlarged cross section near the partition wall 10 and the oil separator 30 of the blow-by gas conduit 1. As shown in the drawings, the lower-side partition wall portion 12 comprises a joint-side portion 13 on the upstream side, and a wall portion 31 provided on the downstream side of the joint-side portion 13. Specifically, as described later, the wall portion 31 is a member wherein a plurality of (three in the present embodiment) orifices 32 which is an introduction hole of the gaseous body is formed, and the wall portion 31 forms one portion of the oil separator 30, and becomes an orifice-side portion of the partition wall 10.

The joint-side portion 13 is a portion joining to the upper-side partition wall portion 11, and comprises a ceiling wall 14 and side walls 15 on both sides. The side walls 15 on both sides extend obliquely downward from both sides of the ceiling wall 14, and have an approximately trapezoidal shape. Also, a plurality of reinforcement ribs 16 is provided inside the ceiling wall 14 and the side walls 15 on both sides.

In the vicinity of the ceiling wall 14 inside the joint-side portion 13, there is formed a plurality of (three in the present embodiment) joint-portion-side communication holes 17 as an area surrounded by one portion of the ceiling wall 14, the side walls 15, and the reinforcement ribs 16. The respective joint-portion-side communication holes 17 communicate with one corresponding orifice 32 of the wall portion 31, and by a whole joint-portion-side communication hole 17 and orifice 32, there is formed a communication hole 18 communicating the upstream side with the downstream side of the partition wall 10. An inner diameter (a flow path cross-sectional area) of the orifice 32 is smaller than an inner diameter of the joint-portion-side communication hole 17, and the orifice 32 becomes a portion having the smallest flow path cross-sectional area in the communication hole 18 (i.e. in a communication path communicating front and back of the partition wall 10), and furthermore, in a whole fluid conduit 1 (in a whole fluid passage where the blow-by gas inside the head cover flows). Thereby, a gas flowing in the communication hole 18 is narrowed in the orifice 32 so as to be accelerated and introduced to the downstream side.

A lower end portion of the upper-side partition wall portion 11 has a shape (a shape wherein the approximately trapezoidal shape is notched) matching an upper face (an outward face of the ceiling wall 14 and the side walls 15 on both sides) of the joint-side portion 13, and fits in the joint-side portion 13 from above. Thereby, the upper-side partition wall portion 11 and the lower-side partition wall portion 12 are joined (welded) to each other as an abutment portion between the upper-side partition wall portion 11 and the joint-side portion 13 as a joint portion 19.

The oil separator 30 comprises the wall portion 31 which is an introduction portion for a gas; a separation member 33 for separating the gas from the gaseous body; and a holding portion 34 holding the separation member 33. The separation member 33 is a member made of a fiber material (for example, a non-woven fabric) in the present embodiment, and has a function such that a gas flow introduced from the orifice 32 of the wall portion 31 collides so as to separate an oil component from the gas.

The holding portion 34 is mounted on a mounting portion 35 provided on the downstream side of the wall portion 31, and is disposed in a predetermined position adjacent to the wall portion 31. Also, the holding portion 34 comprises a box-shaped main member portion 41 housing the separation member 33, and a positioning portion 42 provided on the upstream side of the main member portion 41 and holding the separation member 33 in the predetermined position. Thereby, a predetermined interval is accurately secured between the wall portion 31 and the separation member 33 (the positioning portion 42), and a separation chamber 36 is formed as a space having a certain size.

In an upper side and a lower side of the oil separator 30, there are respectively provided an upper-side outflow port 37 and a lower-side outflow port 38 for the gas. Thereby, the gas separated from an oil by the oil separator 30 goes around the upper side or the lower side of the oil separator 30, and flows into the downstream side mainly through the upper-side outflow port 37 or the lower-side outflow port 38. Incidentally, small holes are formed in right and left of the oil separator 30 as well, and one portion of the gas may flow into the downstream side from the right and left of the oil separator 30 as well.

In the lower side portion 2, there is formed an oil storage portion 21 in such a way so as to be positioned on the downstream side of the oil separator 30, and the oil separated by the oil separator 30 flows in. In the oil storage portion 21, there is provided an outlet 22, and in the outlet 22, there is installed a drain valve 23. Thereby, the oil stored in the oil storage portion 21 is drained from the outlet 22 as needed by opening the drain valve 23. Incidentally, in the oil storage portion 21, a lid member (not shown in the drawings) may be provided as well.

FIG. 7 to FIG. 10 show the oil separator 30 in detail. As shown in the drawings, the main member portion 41 of the holding portion 34 of the oil separator 30 is a member having a box shape including a back portion 41A, side portions 41B on both sides, and a top portion 41C, and there are respectively provided an opening portion 41D on a front face (a side opposite to the back portion 41A) and an opening portion 41E in a bottom portion (a side opposite to the top portion 41C). Also, in the side portions 41B on both sides, there are provided a plurality of claw portions 41F for holding the positioning portion 42, and leg portions 41G for mounting onto the mounting portion 35.

The positioning portion 42 is a plate-like member made of a material (for example, metal) having a thermal conductivity higher than that of the separation member 33, and a small thermal capacity, comprises a front face portion 42A, and an upper end portion 42B and a lower end portion 42C extending backward from an upper end and a lower end of the front face portion 42A, and has a lattice shape (a frame shape) forming a plurality of opening portions 42D. In the present embodiment, there are provided three rows of opening portions 42D extending in an up-and-down direction in such a way so as to lead to the lower end portion 42C from the upper end portion 42B through the front face portion 42A, and the three rows of opening portions 42D form a flow path for the gaseous body flowing toward the upper-side outflow port 37 or the lower-side outflow port 38. Also, when the positioning portion 42 is mounted on the main member portion 41, the respective opening portions 42A are disposed at a position of facing the corresponding orifices 32 of the wall portion 31.

Figure 9:
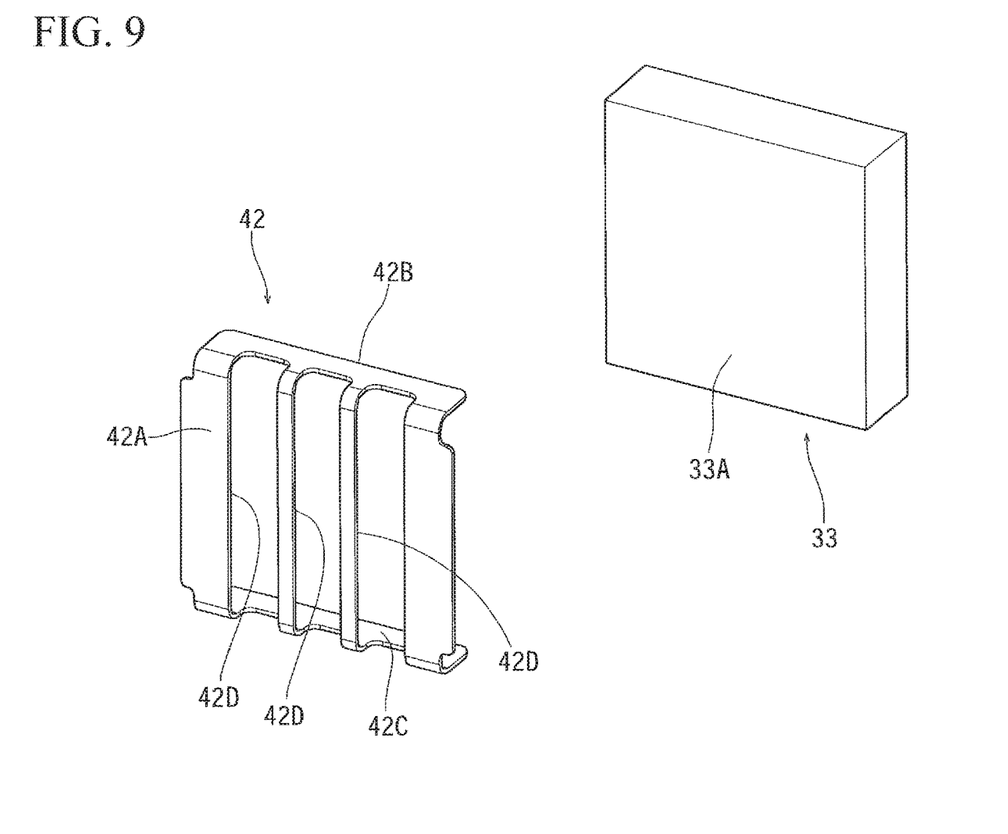
FIG. 9 is a perspective view showing a separation member and a positioning portion of the oil separator according to the embodiment of the present invention.

The positioning portion 42 clamps and holds the separation member 33 having a rectangular parallelepiped shape between the upper end portion 42B and the lower end portion 42C. In that case, a facing surface 33A (a surface facing the orifices 32 of the wall portion 31) of the separation member 33 is disposed along a back face of the front face portion 42A of the positioning portion 42. Thus, in a state wherein the separation member 33 is assembled to the positioning portion 42, the positioning portion 42 and the separation member 33 are mounted inside the box shape of the main member portion 41, and are positioned relative to the main member portion 41 by the claw portions 41F.

Figure 7:
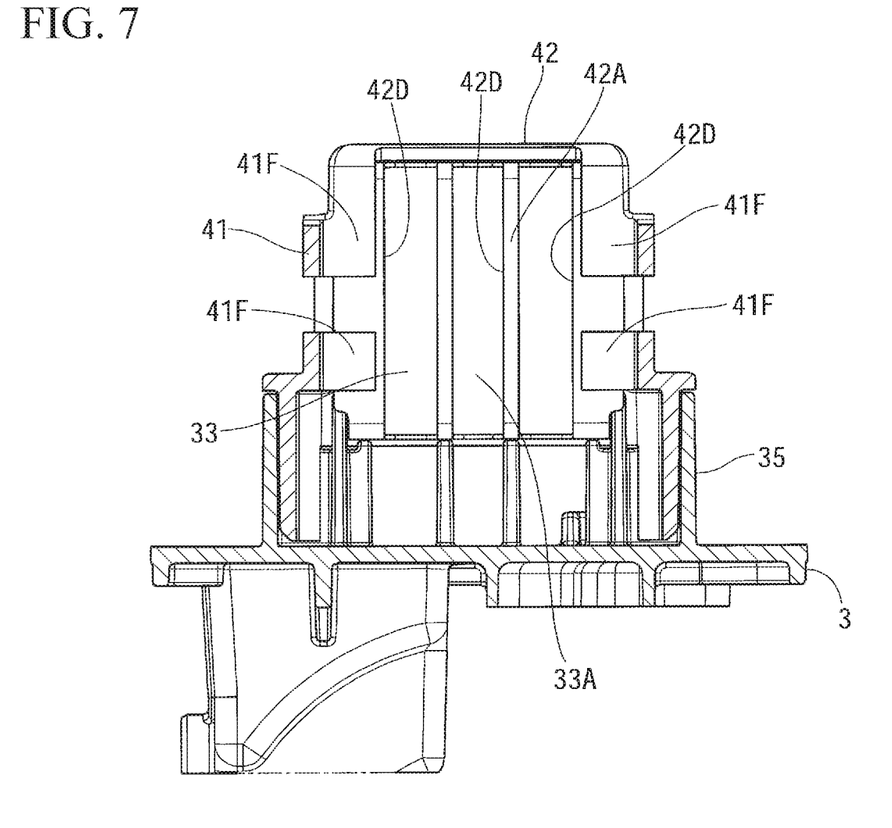
FIG. 7 is a front view showing the oil separator according to the embodiment of the present invention.
Figure 8:
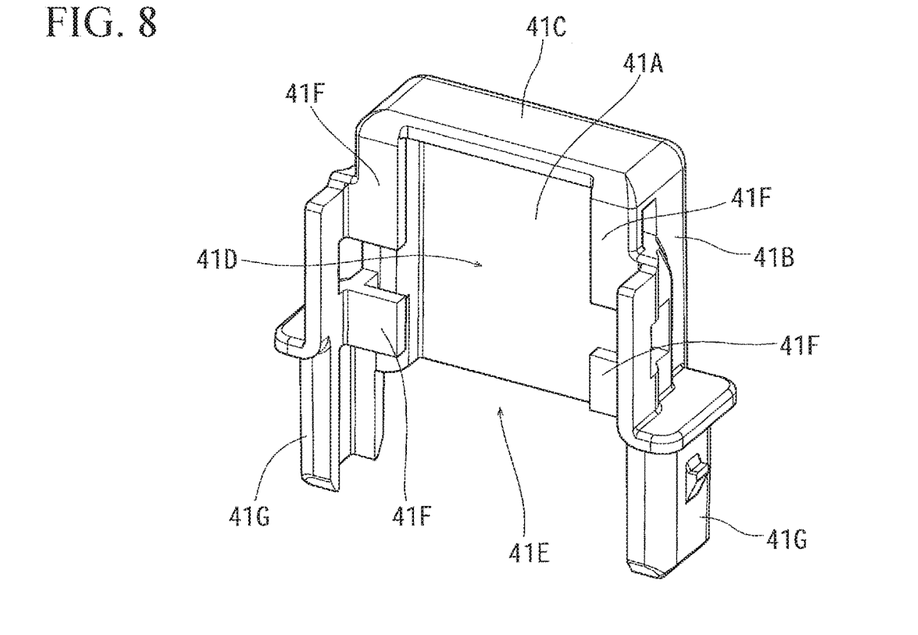
FIG. 8 is a perspective view showing a holding portion of the oil separator according to the embodiment of the present invention.
Figure 10:
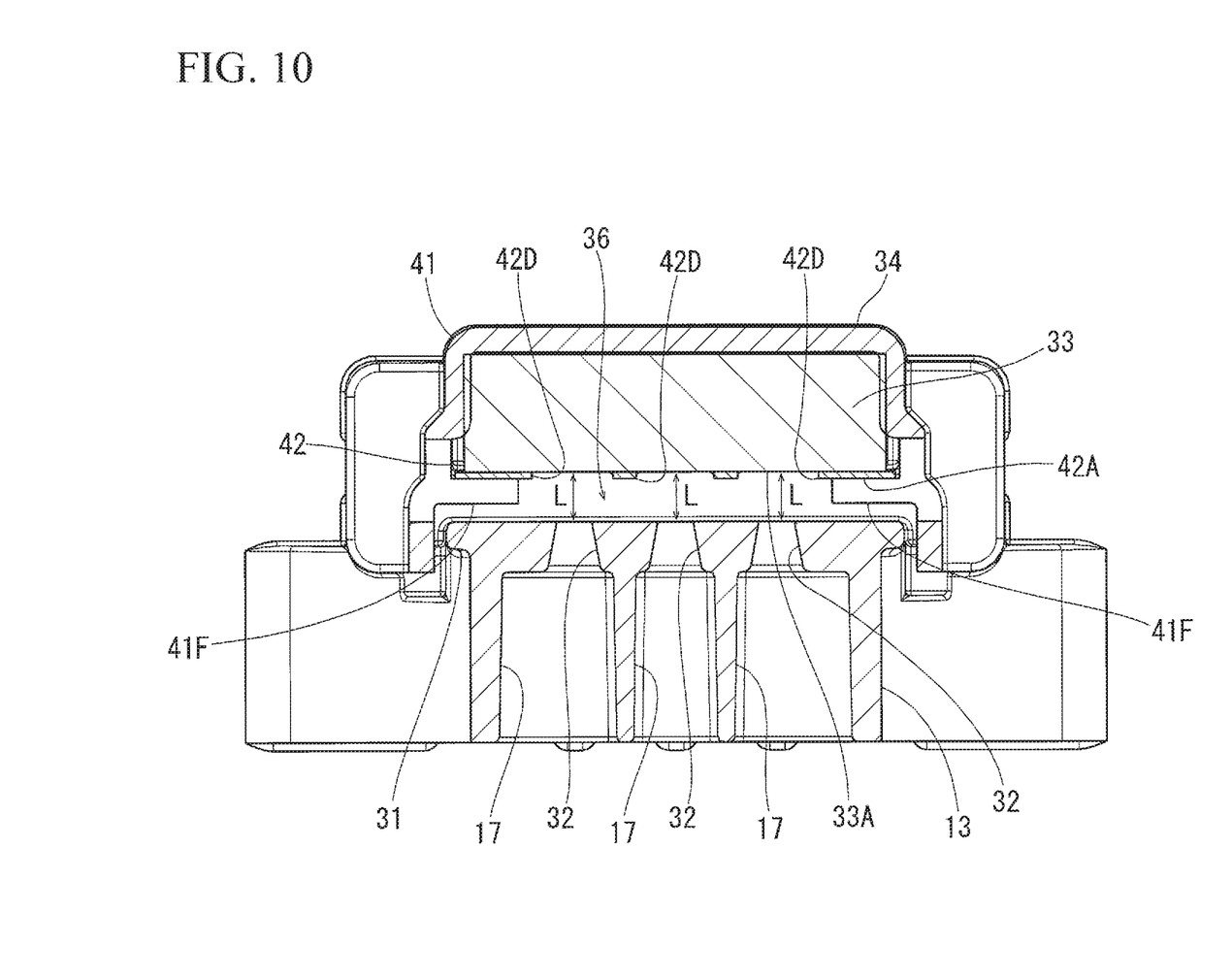
FIG. 10 is a transverse cross-sectional view showing the oil separator according to the embodiment of the present invention.

Thereby, the front face portion 42A of the positioning portion 42 and the adjacent facing surface 33A of the separation member 33 are held at a predetermined position of the main member portion 41, and can be viewed from the opening portion 41D on the front face. As a result, when the holding portion 34 is mounted on the mounting portion 35, an interval L between the orifices 32 and the facing surface 33A of the separation member 33 becomes an accurate predetermined interval.

As mentioned above, according to the oil separator 10 of the present embodiment, the interval L between the orifice 32 which is the introduction hole for the gas and the separation member 33 has an accurate appropriate predetermined interval for an oil separation so as to obtain a stable and high oil separation performance. Also, the gas separated from the oil smoothly flows in the upper side or the lower side along the flow path formed by the opening portions 42D of the positioning portion 42, and flows downstream through the upper-side outflow port 37 or the lower-side outflow port 38 so as to prevent an occurrence of the pressure loss in the gas.

Also, the separation chamber 36 is formed between the wall portion 31 and the holding portion 34 of the oil separator 30, so that even in a case wherein the oil separated in the oil separator 30 is emulsified, and attached onto the holding portion 34 (the positioning portion 42 and the separation member 33), since the flow path of the gas leading to the separation member 33 from the orifice 32 is not allowed to be completely blocked, a gas separation function can be continued to be maintained. Also, the positioning portion 42 is made of the material having the high thermal conductivity and the small thermal capacity such as the metal and the like, and a hot wind of the gas hits so as to rise a temperature of the positioning portion 42 promptly, so that the emulsified oil promptly begins to dissolve, and is drained.

The embodiment of the present invention has been explained above; however, the present invention is not limited to the aforementioned embodiment, and can be changed accordingly within a range described in the invention.

INDUSTRIAL APPLICABILITY

The present invention can be used for an oil separator provided in a blow-by gas conduit of the engine in a vehicle such as an automobile and the like.

EXPLANATION OF SYMBOLS 1 a blow-by gas conduit
2 an upper side member
3 a lower side member
4 a fluid passage
5 an opening end portion 6 an opening end portion
10 a partition wall
11 an upper-side partition wall portion
12 a lower-side partition wall portion
13 a joint-side portion
14 a ceiling wall of the joint-side portion
15 side walls of the joint-side portion
16 reinforcement ribs of the joint-side portion
17 joint-portion-side communication holes
18 communication holes
19 a joint portion
30 an oil separator
31 a wall portion (an orifice-side portion)
32 orifices
33 a separation member
33A a facing surface of the separation member
34 a holding portion
35 a mounting portion
36 a separation chamber
37 an upper-side outflow port
38 a lower-side outflow port
41 a main member portion of the holding portion
42 a positioning portion of the holding portion
42A a front face portion of the positioning portion
42D an opening portion of the positioning portion

What is claimed is:

1. An oil separator separating an oil component from a gaseous body flowing in a flow path, comprising:
    a separation member for separating an oil from the gaseous body;
    an introduction portion including an introduction hole for introducing the gaseous body to the separation member, the introduction hole including a communication hole, and an orifice communicated with the communication hole and having an inner diameter smaller than that of the communication hole; and
    a holding portion holding a facing surface of the separation member relative to the introduction hole at a position separated from the introduction hole at a predetermined interval
    wherein the introduction portion includes:
        an orifice-side portion having a plurality of orifices thereinside, and
        a joint-side portion arranged at an upstream side of the orifice-side portion, and having a celling wall, side walls extending downwardly from two sides of the ceiling wall, and reinforcement ribs partitioning a space surrounded with the ceiling wall and the side walls into a plurality of communication holes communicated with the plurality of orifices, respectively, and
    the holding portion includes:
        a positioning portion having a front face portion, end portions protruding outwardly from ends of the front face portion, and a plurality of opening portions penetrating through the front face portion to form a frame shape and arranged at portions facing the plurality of orifices, and
        a main member portion having a box-shaped portion with an opening, covered by the positioning portion to form a space in which the separation member is stored, claw portions extending into the opening from side portions of the box-shaped portion to hold the positioning portion, and leg portions extending downwardly from the box-shaped portion and fixed at a position to have the predetermined interval between the facing surface of the separation member and the orifice.

2. An oil separator according to claim 1, wherein the positioning portion is disposed along the facing surface of the separation member.

3. An oil separator according to claim 2, further comprising:
    an outflow port for allowing the gaseous body to flow out,
    wherein the frame shape of the positioning portion forms a flow path introducing the gaseous body to the outflow port.

4. An oil separator according to claim 3, wherein the flow path does not have a frame extending in an intersecting direction.

5. An oil separator according to claim 2, wherein the positioning portion is made of a material having a thermal conductivity higher than that of the separation member.

6. An oil separator according to claim 2, further including a separation chamber between the positioning portion and the introduction portion.

7. An oil separator according to claim 1, wherein the separation member is made of a fiber material.

* * * * *